United States Patent
Blezard et al.

(10) Patent No.: US 11,953,262 B2
(45) Date of Patent: *Apr. 9, 2024

(54) RECYCLABLE, THERMALLY INSULATED SHIPPING CONTAINER WITH PACKED, LOOSE-FILL ORGANIC INSULATION AND PCM BLADDER INSERT

(71) Applicant: Packaging Technology Group, LLC, Fall River, MA (US)

(72) Inventors: William C. Blezard, Mattapoisett, MA (US); Thomas Lawlor, Foxborough, MA (US); Kyle Phalen, Berkley, MA (US)

(73) Assignee: Packaging Technology Group, LLC, Fall River, MA (US)

( * ) Notice: Subject to any disclaimer, the term of this patent is extended or adjusted under 35 U.S.C. 154(b) by 14 days.

This patent is subject to a terminal disclaimer.

(21) Appl. No.: 17/668,610

(22) Filed: Feb. 10, 2022

(65) Prior Publication Data

US 2023/0251011 A1 Aug. 10, 2023

Related U.S. Application Data

(63) Continuation-in-part of application No. 17/508,418, filed on Oct. 22, 2021, now Pat. No. 11,731,826, and
(Continued)

(51) Int. Cl.
*F25D 3/08* (2006.01)
*B65D 21/02* (2006.01)
(Continued)

(52) U.S. Cl.
CPC ........... *F25D 3/08* (2013.01); *B65D 21/0202* (2013.01); *B65D 21/022* (2013.01);
(Continued)

(58) Field of Classification Search
CPC .............. B65D 21/0202; B65D 21/022; B65D 39/0005; B65D 81/18; B65D 81/3813;
(Continued)

(56) References Cited

U.S. PATENT DOCUMENTS 1,065,398 A 6/1913 Scudder
1,121,072 A 12/1914 Corwin
(Continued)

FOREIGN PATENT DOCUMENTS

GB 2554127 A 3/2018
WO WO-2015121167 A1 8/2015
(Continued)

OTHER PUBLICATIONS

International Search Report and Written Opinion for International Patent Application No. PCT/US2022/046552 dated Feb. 20, 2023.

*Primary Examiner* — Christopher R Demeree
(74) *Attorney, Agent, or Firm* — Goodwin Procter LLP

(57) ABSTRACT

A recyclable, thermally insulated shipping container is entirely constructed from organic fiber materials in such a manner that the container is curbside recyclable without separation of component materials. The container includes a corrugated cardboard outer box having a bottom wall, a plurality of sidewalls and a top wall, a corrugated cardboard inner liner assembly comprising a corrugated cardboard inner box having a bottom wall and a plurality of sidewalls, and a corrugated cardboard lid assembly. The outer box, inner liner assembly and lid assembly cooperate to create a plurality of thermally insulated cavities which are filled and uniformly packed with predetermined volumes of loose-fill cellulose (organic fiber) insulation to create a predetermined insulating value. The container provides a fully insulated six-sided product cavity to receive a temperature-controlled product. A portion of the product cavity may be filled with
(Continued)

a PCM or other thermal media to provide a consistent temperature profile.

19 Claims, 17 Drawing Sheets

Related U.S. Application Data a continuation-in-part of application No. 17/239,550, filed on Apr. 24, 2021, now Pat. No. 11,698,215, which is a continuation of application No. 16/579,755, filed on Sep. 23, 2019, now Pat. No. 10,989,460, which is a continuation of application No. 15/401,050, filed on Jan. 8, 2017, now Pat. No. 10,422,565, which is a continuation of application No. 15/014,428, filed on Feb. 3, 2016, now Pat. No. 10,288,337, which is a continuation of application No. 13/891,259, filed on May 10, 2013, now Pat. No. 9,267,722.

(51) Int. Cl.
  *B65D 39/00* (2006.01)
  *B65D 81/18* (2006.01)
  *B65D 81/38* (2006.01)
  *F28D 20/02* (2006.01)

(52) U.S. Cl.
  CPC ......... *B65D 39/0005* (2013.01); *B65D 81/18* (2013.01); *B65D 81/3813* (2013.01); *F25D 2303/08222* (2013.01); *F25D 2303/0843* (2013.01); *F25D 2303/0844* (2013.01); *F25D 2331/804* (2013.01); *F28D 20/02* (2013.01)

(58) Field of Classification Search
  CPC ..... B65D 81/3858; B65D 65/466; F25D 3/08; F25D 2303/08222; F25D 2303/0843; F25D 2303/0844; F25D 2331/804; F25D 2303/082; F25D 2303/0845; F28D 20/02; Y02W 30/80
  USPC .................................................. 229/103.11
  See application file for complete search history.

(56) References Cited

U.S. PATENT DOCUMENTS

| | | | |
|---|---|---|---|
| 1,527,167 A | | 2/1925 | Birdseye |
| 1,691,178 A | | 11/1928 | Beaman |
| 2,165,327 A | | 7/1939 | Zalkind |
| 2,360,806 A | | 10/1944 | Van Rosen |
| 2,927,720 A | | 3/1960 | Adams |
| 3,565,320 A | | 2/1971 | Edward et al. |
| 4,335,844 A | | 6/1982 | Egli |
| 5,564,570 A | * | 10/1996 | Jaszai ................ B65D 81/1075 206/219 |
| 6,009,685 A | | 1/2000 | Dahlberg |
| 6,761,041 B2 | * | 7/2004 | Roth ........................ F25D 3/08 62/530 |
| 6,868,982 B2 | | 3/2005 | Gordon |
| 7,328,583 B2 | * | 2/2008 | Hillman ................ B65D 5/566 62/457.2 |
| 7,749,923 B2 | | 7/2010 | Moore et al. |
| 8,453,477 B2 | | 6/2013 | Crespo et al. |
| 8,454,795 B1 | | 6/2013 | Henderson et al. |
| 8,541,074 B2 | | 9/2013 | Babinsky et al. |
| 8,647,717 B2 | | 2/2014 | Babinsky et al. |
| 8,652,598 B2 | | 2/2014 | Babinsky et al. |
| 8,763,811 B2 | | 7/2014 | Lantz |
| 8,795,470 B2 | | 8/2014 | Henderson et al. |
| 9,550,618 B1 | | 1/2017 | Jobe |
| 9,751,683 B1 | | 9/2017 | Jobe |
| 9,878,838 B2 | | 1/2018 | Kaimann et al. |
| 9,957,098 B2 | | 5/2018 | Jobe |
| 9,963,287 B2 | 5/2018 | Vogel et al. |
| 9,981,797 B2 | 5/2018 | Aksan et al. |
| 9,994,385 B2 | 6/2018 | Dudi et al. |
| 10,046,901 B1 | 8/2018 | Jobe |
| 10,266,332 B2 | 4/2019 | Aksan et al. |
| 10,357,936 B1 | 7/2019 | Vincent et al. |
| 10,597,219 B2 | 3/2020 | Jobe |
| 10,800,131 B1 | 10/2020 | Vincent et al. |
| 10,800,596 B1 | 10/2020 | Vincent et al. |
| 10,816,128 B2 | 10/2020 | McGoff et al. |
| 10,882,682 B2 | 1/2021 | Collison et al. |
| 11,040,818 B2 | 6/2021 | Jobe |
| 11,046,500 B2 | 6/2021 | Collison et al. |
| 11,066,228 B2 | 7/2021 | Sollie et al. |
| 11,078,008 B2 | 8/2021 | Dankbaar et al. |
| 11,117,731 B2 | 9/2021 | Waltermire et al. |
| 11,137,198 B2 | 10/2021 | Waltermire et al. |
| 11,161,680 B2 | 11/2021 | Veiseh |
| 11,214,427 B2 | 1/2022 | Collison et al. |
| 2003/0102317 A1 | 6/2003 | Gordon |
| 2008/0087752 A1 | 4/2008 | Johnson et al. |
| 2008/0196410 A1 | 8/2008 | Primlani |
| 2010/0044267 A1 | 2/2010 | Tolibas-Spurlock et al. |
| 2010/0258574 A1 | 10/2010 | Bentley |
| 2011/0041415 A1 | 2/2011 | Esposito |
| 2011/0042449 A1 | 2/2011 | Copenhaver et al. |
| 2011/0072847 A1 | 3/2011 | Crespo et al. |
| 2011/0210164 A1 | 9/2011 | Babinsky et al. |
| 2011/0223410 A1 | 9/2011 | Gencer et al. |
| 2011/0241514 A1 | 10/2011 | Nomura et al. |
| 2012/0312814 A1 | 12/2012 | Tolibas-Spurlock et al. |
| 2013/0014450 A1 | 1/2013 | Esposito |
| 2013/0037469 A1 | 2/2013 | Harris et al. |
| 2013/0112694 A1 | 5/2013 | Bentley |
| 2013/0312894 A1 | 11/2013 | Babinsky et al. |
| 2013/0344304 A1 | 12/2013 | Babinsky et al. |
| 2014/0360044 A1 | 12/2014 | Smith |
| 2015/0114872 A1 | 4/2015 | Tolibas-Spurlock et al. |
| 2015/0232249 A1 | 8/2015 | Kaimann et al. |
| 2016/0355320 A1 | 12/2016 | Maier-Eschenlohr et al. |
| 2017/0066582 A1 | 3/2017 | Vogel et al. |
| 2017/0283157 A1 | 10/2017 | Jobe |
| 2017/0307302 A1 | 10/2017 | Jacobs et al. |
| 2017/0349356 A1 | 12/2017 | Dudi et al. |
| 2017/0362005 A1 | 12/2017 | Tolibas-Spurlock et al. |
| 2018/0086538 A1 | 3/2018 | Jobe |
| 2018/0194534 A1 | 7/2018 | Jobe |
| 2018/0229916 A1 | 8/2018 | Jobe |
| 2018/0229917 A1 | 8/2018 | Jobe |
| 2018/0237206 A1 | 8/2018 | Jobe |
| 2018/0299059 A1 | 10/2018 | Mcgoff et al. |
| 2018/0305109 A1 | 10/2018 | Jobe |
| 2018/0334308 A1 | 11/2018 | Moore et al. |
| 2018/0339838 A1 | 11/2018 | Hall |
| 2019/0032991 A1 | 1/2019 | Waltermire et al. |
| 2019/0234679 A1 | 8/2019 | Waltermire et al. |
| 2019/0248573 A1 | 8/2019 | Collison et al. |
| 2019/0329962 A1 | 10/2019 | Dankbaar et al. |
| 2019/0359413 A1 | 11/2019 | Sollie et al. |
| 2019/0359414 A1 | 11/2019 | Sollie et al. |
| 2019/0367208 A1 | 12/2019 | Jobe |
| 2019/0390892 A1 | 12/2019 | Waltermire et al. |
| 2020/0024061 A1 | 1/2020 | Jobe |
| 2020/0063359 A1 | 2/2020 | Everett et al. |
| 2020/0079574 A1 | 3/2020 | Caps |
| 2020/0088458 A1 | 3/2020 | Waltermire et al. |
| 2020/0102134 A1 | 4/2020 | Hall et al. |
| 2020/0103159 A1 | 4/2020 | Waltermire et al. |
| 2020/0122909 A1 | 4/2020 | Jobe |
| 2020/0165056 A1 | 5/2020 | Jobe |
| 2020/0231365 A1 | 7/2020 | Veiseh |
| 2020/0262637 A1 | 8/2020 | Tattam |
| 2020/0290790 A1 | 9/2020 | Mowery et al. |
| 2020/0307895 A1 | 10/2020 | Jobe |
| 2020/0407147 A1 | 12/2020 | Jobe |
| 2021/0039869 A1 | 2/2021 | Waltermire et al. |
| 2021/0047102 A1 | 2/2021 | Sollie et al. |
| 2021/0048135 A1 | 2/2021 | Mcgoff et al. |
| 2021/0094746 A1 | 4/2021 | Demarest et al. |

(56) References Cited

U.S. PATENT DOCUMENTS

| | | |
|---|---|---|
| 2021/0094747 A1 | 4/2021 | Demarest et al. |
| 2021/0101734 A1 | 4/2021 | Collison et al. |
| 2021/0102746 A1 | 4/2021 | Waltermire et al. |
| 2021/0171271 A1 | 6/2021 | Collison et al. |
| 2021/0253330 A1 | 8/2021 | Madanagopal et al. |
| 2021/0254877 A1 | 8/2021 | Massenzo et al. |
| 2021/0300665 A1* | 9/2021 | Melchor ............ B65D 81/3827 |
| 2021/0394994 A1 | 12/2021 | Maier-Eschenlohr et al. |
| 2022/0002070 A1* | 1/2022 | Moghaddas ............ F25D 3/125 |
| 2022/0026140 A1 | 1/2022 | Waltermire et al. |
| 2022/0026141 A1 | 1/2022 | Waltermire et al. |
| 2022/0033167 A1 | 2/2022 | Collison et al. |

FOREIGN PATENT DOCUMENTS

| | | |
|---|---|---|
| WO | WO-2018156481 A1 | 8/2018 |
| WO | WO-2018157978 A1 | 9/2018 |
| WO | WO-2018213470 A1 | 11/2018 |
| WO | WO-2019113453 A1 | 6/2019 |
| WO | WO-2019169059 A1 | 9/2019 |
| WO | WO-2019231934 A1 | 12/2019 |
| WO | WO-2020055821 A1 | 3/2020 |
| WO | WO-2020072527 A1 | 4/2020 |
| WO | WO-2020092023 A2 | 5/2020 |
| WO | WO-2020093009 A1 | 5/2020 |
| WO | WO-2020188324 A1 | 9/2020 |
| WO | WO-2020263150 A1 | 12/2020 |
| WO | WO-2021067367 A1 | 4/2021 |
| WO | WO-2021081047 A1 | 4/2021 |
| WO | WO-2021093996 A1 | 5/2021 |
| WO | WO-2021163435 A1 | 8/2021 |
| WO | WO-2022009129 A1 | 1/2022 |
| WO | WO-2022009130 A1 | 1/2022 |

\* cited by examiner

RECYCLABLE, THERMALLY INSULATED SHIPPING CONTAINER WITH PACKED, LOOSE-FILL ORGANIC INSULATION AND PCM BLADDER INSERT

CROSS-REFERENCE TO RELATED APPLICATIONS

This application is a continuation in part of U.S. application Ser. No. 17/508,418, filed Oct. 22, 2021, the entire contents of which are incorporated herein by reference.

This application is also a continuation-in-part of U.S. application Ser. No. 17/239,550, filed Apr. 23, 2021, which is a continuation of U.S. application Ser. No. 16/579,755, filed Sep. 23, 2019, now U.S. Pat. No. 10,989,460, issued Apr. 27, 2021, which is a continuation of U.S. application Ser. No. 15/401,050, filed Jan. 8, 2017, now U.S. Pat. No. 10,422,565, issued Sep. 24, 2019, which is a continuation of U.S. application Ser. No. 15/014,428, filed Feb. 3, 2016 now U.S. Pat. No. 10,288,337, issued May 14, 2019, which is a continuation of U.S. application Ser. No. 13/891,259, filed May 10, 2013, now U.S. Pat. No. 9,267,722, issued Feb. 23, 2016, the entire contents of which are incorporated herein by reference

BACKGROUND OF THE INVENTION

(1) Field of the Invention

The instant invention relates to a recyclable, thermally insulated shipping container which is constructed from all wood fiber material and/or other organic recyclable materials, does not contain any plastic materials and is curbside recyclable.

(2) Description of Related Art

The shipping or transportation of various perishable materials, such as medical supplies, food, etc., frequently requires that such materials be maintained within a stable temperature range, either higher or lower than ambient temperatures to which the packaging of the materials will be exposed. Accordingly, there are various different types of temperature controlled insulated containers or shippers which are utilized for these critical applications.

In many applications, an insulated shipper comprises a cardboard outer box, inorganic insulating material, such as a plurality of expanded polystyrene (EPS) panels or pieces of insulation, and phase change material (PCM) gel packs, bricks, etc. used to heat or cool the interior of the shipper. While the prior art shipping containers are effective for their intended purpose, the combined use of both cardboard and inorganic insulation, i.e. EPS and/or other plastic materials, in a single packaging system poses problems for recycling of the container in traditional recycling programs as the different materials must be separated for recycling of each material, or cannot be recycled at all, requiring dumping into a landfill.

Due to increasing demands from environmentally conscious businesses, customers and the general public, there is a growing need to utilize shipping and packing containers which are fully recyclable without separation of any component parts.

SUMMARY OF THE INVENTION

The present disclosure provides a unique all organic fiber recyclable, thermally insulated shipping container which can be placed directly into the recycling stream without separation of the insulating materials and may be recycled in a such a way that wood fiber materials are re-pulpable and capable of being converted into other paper-based products.

A recyclable, thermally insulated shipping container in accordance with the teachings of the present invention is entirely constructed from organic fiber materials (container and insulation) in such a manner that the container is curbside recyclable without any separation of component materials.

The container may include a corrugated cardboard outer box having a bottom wall, a plurality of sidewalls and a top wall, a corrugated cardboard inner liner assembly including a corrugated cardboard inner box having a bottom wall and a plurality of sidewalls, and a corrugated cardboard lid assembly. In some embodiments, the sidewalls of the liner assembly may comprise paper materials.

The outer box is conventional in construction formed from a box blank secured in a square or rectangular shape along a side wall edge, with top and bottom closure flaps to create a traditional six-sided box.

The inner box is similarly conventional box construction forming a square or rectangular five-sided open top box with bottom closure flaps forming a bottom wall.

The inner liner assembly may further consist of a corrugated cardboard or paperboard liner flange having a continuous top shelf portion, a plurality of outer securing tabs projecting downwardly from an outer peripheral edge of the top shelf portion, and a plurality of inner securing tabs projecting downwardly from an inner peripheral edge of the top shelf portion.

In the assembly, the inner securing tabs of the flange are received within the sidewalls of the inner box and secured with glue to inner surfaces of inner box sidewalls The outer securing tabs are received within the sidewalls of the outer box and secured with glue to inner surfaces of outer box sidewalls. The inner liner assembly is secured within the outer box such that the shelf portion is positioned below the top wall thereof to create a lid cavity above the shelf portion and below the top wall. The inner box forms a product cavity within the interior of the container assembly. The inner liner assembly and the outer box cooperate to form a side thermal insulating cavity between the respective sidewalls thereof.

A predetermined volume of loose-fill cellulose, or other organic fiber insulation is filled and packed within the side thermal insulating cavity to provide a predetermined thermal insulating value. After the sidewall cavity is filled and packed, a corrugated cardboard strengthening panel may be received within a bottom portion of the outer box and positioned in adjacent facing relation with the bottom wall of the inner box. The strengthening panel thus closes the sidewall cavity and completely captures the loose fill insulation. Additionally, the outer box bottom wall and sidewalls, and the strengthening panel cooperate to form a bottom thermal insulating cavity in which another volume of loose-fill cellulose insulation is filled and packed to provide a predetermined thermal insulating value. Once filled and packed, the bottom closure flaps are closed to form the bottom wall and capture the cellulose material.

The lid assembly may comprise a thermally insulated corrugated cardboard lid box having a bottom wall, a top wall and a plurality of sidewalls which cooperate to define a thermal insulating lid cavity. Before closing the lid box, another volume of loose-fill cellulose insulation filled and packed within the lid cavity to provide a predetermined thermal insulating value. The lid assembly is then received within the lid cavity. The top flaps remain unsealed so that the end consumer or shipper can access the inner product cavity.

It can thus be seen that the side, bottom and lid insulated cavities provide a fully insulated six-sided product cavity to receive a temperature-controlled product within a defined product box.

A portion of the product cavity not occupied by the product box may be filled with phase change material (PCM) packs, bricks, etc. or other heating or cooling medium to provide a consistent temperature within the product cavity. Some exemplary embodiments may include a novel PCM bladder which is designed and configured to receive and hold a flowable PCM slurry at the point of packaging, thus completely eliminating the need to pre-condition and store large volumes of PCM gel packs.

While embodiments of the invention have been described as having the features recited, it is understood that various combinations of such features are also encompassed by particular embodiments of the invention and that the scope of the invention is limited by the claims and not the description.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

DETAILED DESCRIPTION OF THE INVENTION

Figure 1:
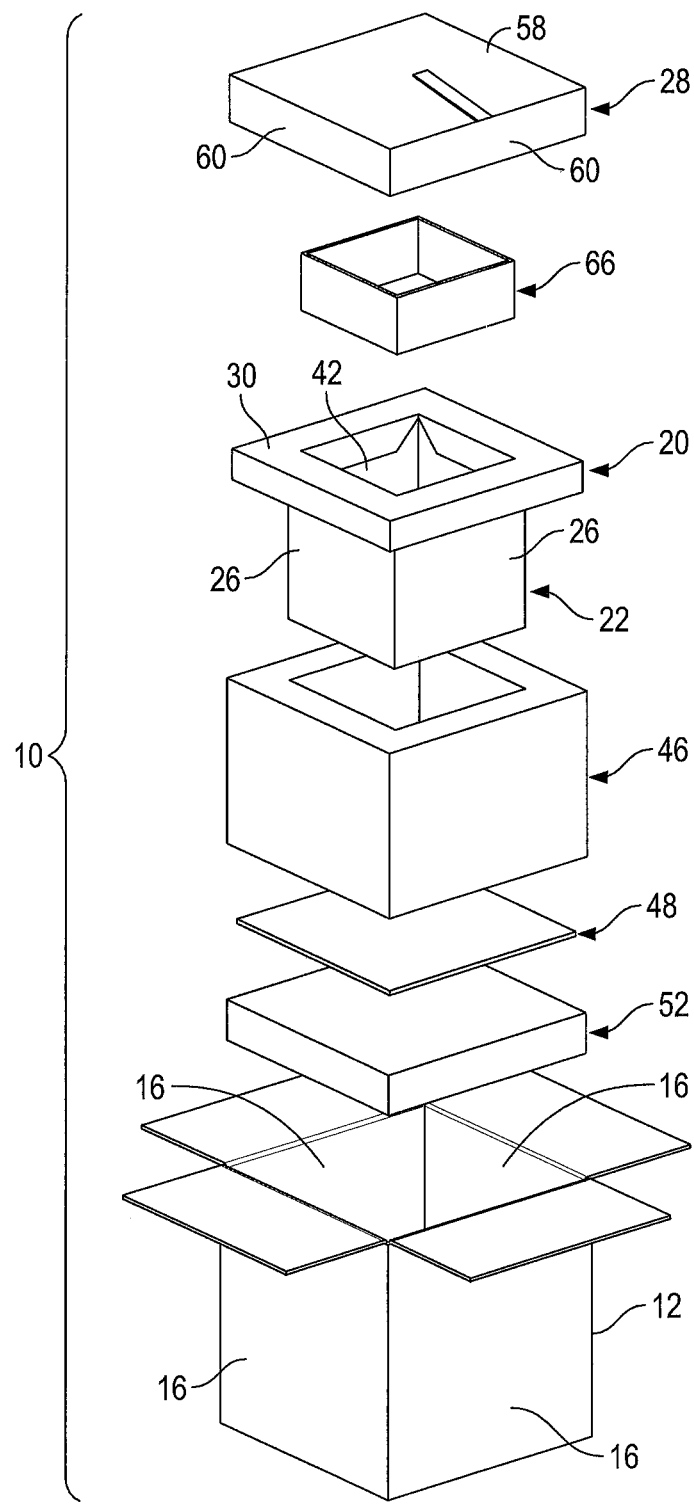
FIG. 1 is an exploded perspective view of a recyclable, thermally insulated shipping container in accordance with the teachings of the present invention.
Figure 2:
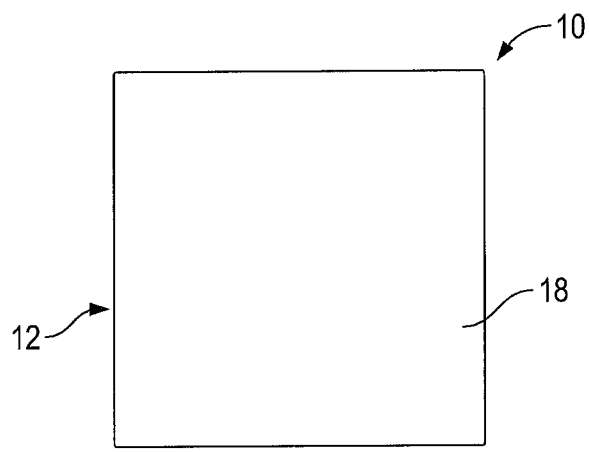
FIG. 2 is a top view thereof with the top flaps in a closed and sealed configuration.
Figure 3:
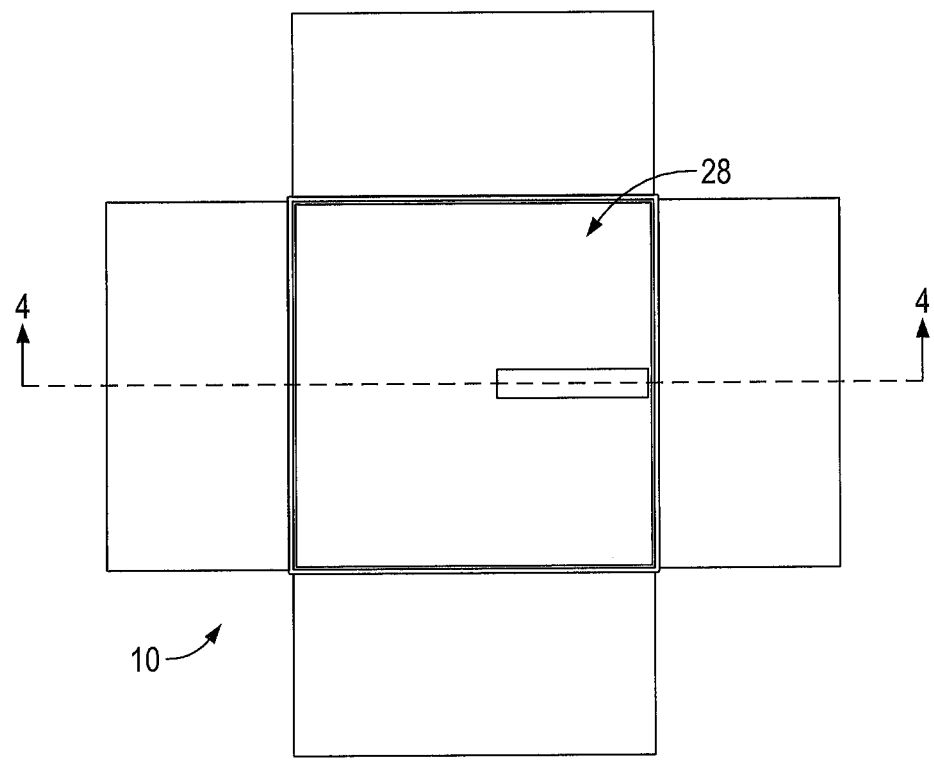
FIG. 3 is a top view thereof with the top flaps open.

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

Referring now to the drawings, a recyclable, thermally insulated shipping container according to an exemplary embodiment of the invention is illustrated and generally indicated at 10 in FIGS. 1-8.

As will be more fully described hereinafter, a recyclable, thermally insulated shipping container 10 in accordance with the teachings of the present invention may be entirely constructed from recyclable organic fiber materials (container and insulation) in such a manner that the entire container assembly 10 is curbside recyclable without any separation of component materials.

The term "recyclable organic fiber" in the context of a box material is intended to include any type of natural wood fiber or plant fiber material which can be provided as a panel or corrugated panel material, such as corrugated cardboard, for forming a box structure.

The term "recyclable organic fiber" in the context of an insulating material is intended to include any type of natural wood fiber or plant fiber materials which can be provided as a loose-fill insulating material. Exemplary materials include loose-fill cellulose insulation, other non-woven wood or paper materials, rice, hemp, flax, wool, etc.

The container 10 may include an outer box 12 having a bottom wall 14, a plurality of sidewalls 16 and a top wall 18, an inner liner assembly 20 including an inner box 22 having a bottom wall 24 and a plurality of sidewalls 26, and a lid assembly 28. The outer box 12, inner box 22 and lid assembly, may in some embodiments comprise corrugated cardboard material.

The outer box 12 may be conventional box construction formed from a box blank secured in a square or rectangular shape along a side wall edge, with top and bottom closure flaps to create a traditional six-sided box.

The inner box 22 may similarly be conventional box construction forming a square or rectangular five-sided open top box with bottom closure flaps forming the bottom wall 24.

Figure 7:
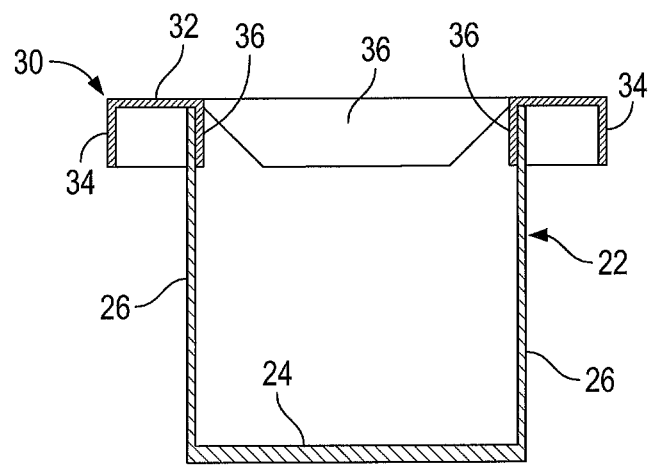
FIG. 7 is a cross-sectional view thereof taken along line 7-7.
Figure 6:
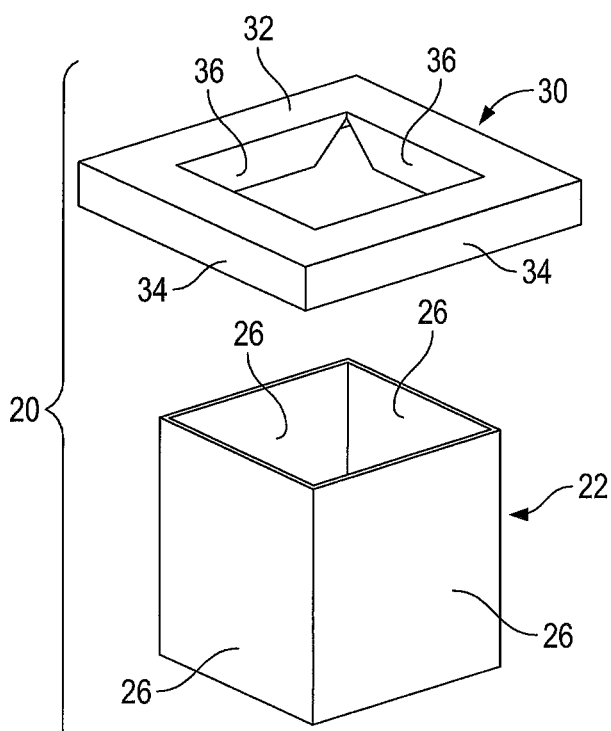
FIG. 6 is an exploded perspective view thereof.
Figure 8:
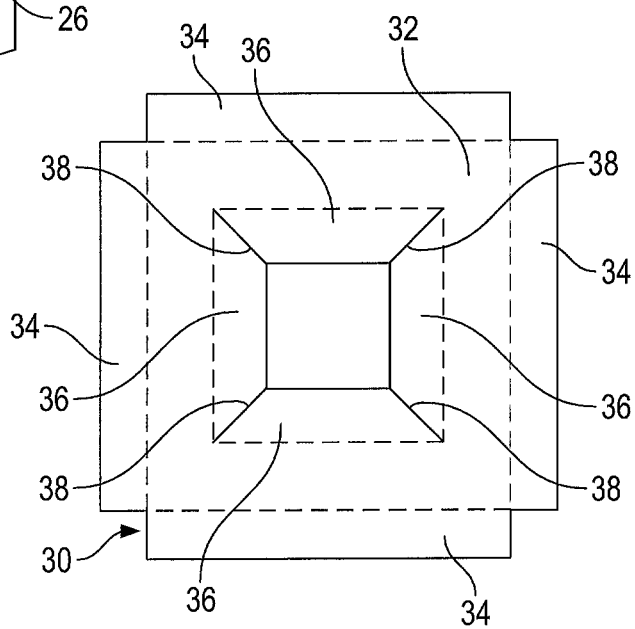
FIG. 8 is a top view of the liner flange blank.

The inner liner assembly 20 may further consist of a liner flange 30 having a continuous top shelf portion 32, a plurality of outer securing tabs 34 projecting downwardly from an outer peripheral edge of the top shelf portion 32, and a plurality of inner securing tabs 34 projecting downwardly from an inner peripheral edge of the top shelf portion 32. The liner flange 30 may be formed from corrugated cardboard. FIG. 7 illustrates the flange 30 (die cut blank) where it can be seen that the outer tabs 34 are die cut as part of the blank and folded downwardly to provide surfaces to adhere to the outer box 12. The inner tabs 36 are similarly die cut with the blank with inwardly angled cuts 38 forming trapezoidal shaped tabs 36.

In the assembly, the inner securing tabs 36 of the flange 30 are received within the sidewalls 26 of the inner box 22 and may be secured with glue to inner surfaces of inner box sidewalls 26. After the flange 30 is assembled with the inner box 22, the outer securing tabs 34 are received within the sidewalls 16 of the outer box 12 and may be secured with glue to inner surfaces of outer box sidewalls 16. While glue is described as an exemplary method of attachment, other securing methods are also contemplated including various forms of mechanical fasteners.

Turning to the cross-sectional view in FIG. 4 it can be seen that the inner liner assembly 20 is secured within the outer box 12 such that the shelf portion 32 is positioned below the top wall 18 (or top lip) thereof to create a lid cavity 40 above the shelf portion 32 and below the top wall 18. The inner box 22 forms a product cavity 42 within the interior of the container assembly 10. The inner liner assembly 20 and the outer box 12 cooperate to form a square annular shaped side thermal insulating cavity 44 between the respective sidewalls 16,26 thereof.

Figure 4:
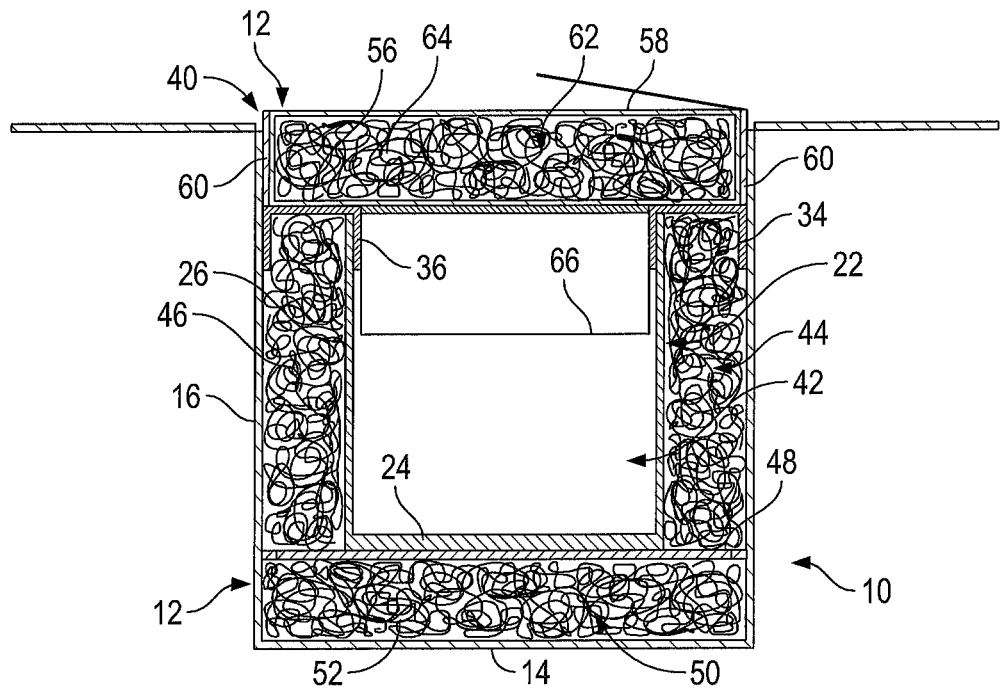
FIG. 4 is a cross-sectional view thereof taken along line 4-4 of FIG. 3.
Figure 5:
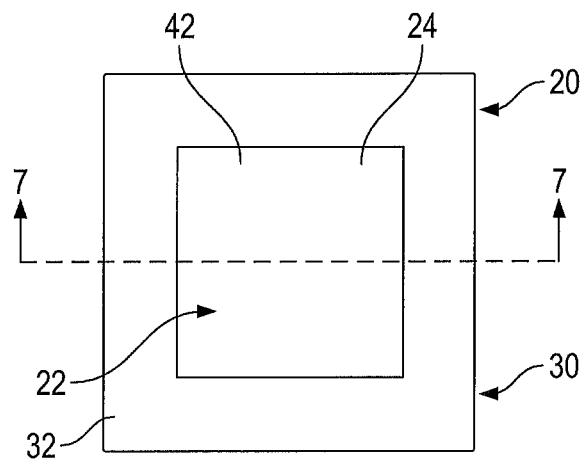
FIG. 5 is a top view of the inner liner assembly of the present shipping container.

Referring to FIGS. 1 and 4, a predetermined volume of loose-fill cellulose insulation 46 may be filled and uniformly packed within the side thermal insulating cavity 44 to provide a predetermined thermal insulating value. As noted above, loose-fill cellulose is used in the exemplary embodiments, but, it should be understood that any recyclable, loose-fill, organic wood or plant fiber material may be utilized. In some embodiments, the loose-fill cellulose 46 may be portioned and packed in such a manner to provide an insulting value of between R2-6 per inch of thickness, and preferably between R4-5 per inch of thickness. The density may be in the range of 2-6 pounds of cellulose per cubic foot, and more preferably in the range of 3.5-5 pounds of cellulose insulating material per cubic foot. This packing density provides and insulating value very similar to Styrofoam EPS and thus provides a highly effective alternative. In the exemplary embodiments, the thickness of the insulating material may be about 1.0 inch to about 2.0 inch but may be as much as 4-5 inches thick depending on the application.

The loose-fill cellulose material 46 may in some embodiments comprise a borate treated loose-fill cellulose material, which is fire resistant, mold, fungus, mildew, and insect resistant.

Turning to FIG. 7 it is noted that the unique die cut flange 30 allows both the outer and inner tabs 34,36 to be folded and received in downwardly extending orientations, to provide a full-length glue line around the periphery of the inner surface of the outer box 12 and to provide a tight seal around the upper peripheral edge lip of the inner box 22. Accordingly, this die cut configuration forms tight fitting interconnections between the inner and outer boxes 12,22 and the flange 30 and effectively captures and prevents the loose-fill cellulose 46 from leaking out of the side cavity 44 into the interior product cavity 42 of the box 20. While the loose-fill insulating material is advantageous for packing and recycling, the loose-fill nature of the material makes it difficult to capture and contain within enclosed spaces. Both medical and food industry customers express the need to prevent any of the cellulose material 46 from leaking into the interior of the shipper where it could contact the product being shipped.

After the sidewall cavity 44 is filled and packed, a strengthening panel 48 may be received within a bottom portion of the outer box 12 and positioned in adjacent facing relation with the bottom wall 24 of the inner box 22. The strengthening panel 48 may be formed from corrugated cardboard. The strengthening panel 48 thus closes the sidewall cavity 44 and completely captures the loose fill insulation 46 within the side cavity 44. Additionally, the outer box bottom wall 14 and sidewalls 16, and the strengthening panel 48 cooperate to form a bottom thermal insulating cavity 50 in which another volume of loose-fill cellulose insulation 52 is filled and packed to provide a predetermined thermal insulating value as described hereinabove. Once filled and packed, the bottom closure flaps are closed to form the bottom wall 14 and capture the cellulose material 52 within the bottom cavity 50. The strengthening panel 48 has been found to be a critical strengthening component in drop tests to provide improved rigidity to the container 10 and prevent the loose cellulose material 46,52 from leaking (spraying or blowing) into the interior product cavity 42 due to sudden pressure forces encountered in a drop.

The lid assembly 28 comprises a thermally insulated lid box 54 having a bottom wall 56, a top wall 58 and a plurality of sidewalls 60 which cooperate to define a thermal insulating lid cavity 62. The lid box 54 may be formed from corrugated cardboard. Before closing the lid box 54, another volume of loose-fill organic insulation (cellulose) 64 is filled and packed within the lid cavity to provide a predetermined thermal insulating value (as described above). The lid assembly 28 is then received within the lid cavity 40.

The top flaps of the container 10 remain unsealed so that the end consumer or shipper can access the inner product cavity 42 for packing.

It can thus be seen that the side, bottom, and lid insulation volumes 46, 52, 64 provide a fully thermally insulated six-sided product cavity 42 to receive a temperature-controlled product (now shown).

In this regard, some embodiments may further comprise a product tray 66 which receives the temperature-controlled product, separating it from a PCM material or other thermal mass (not shown) which may be positioned in a bottom portion of the inner product cavity 42.

Figure 9:
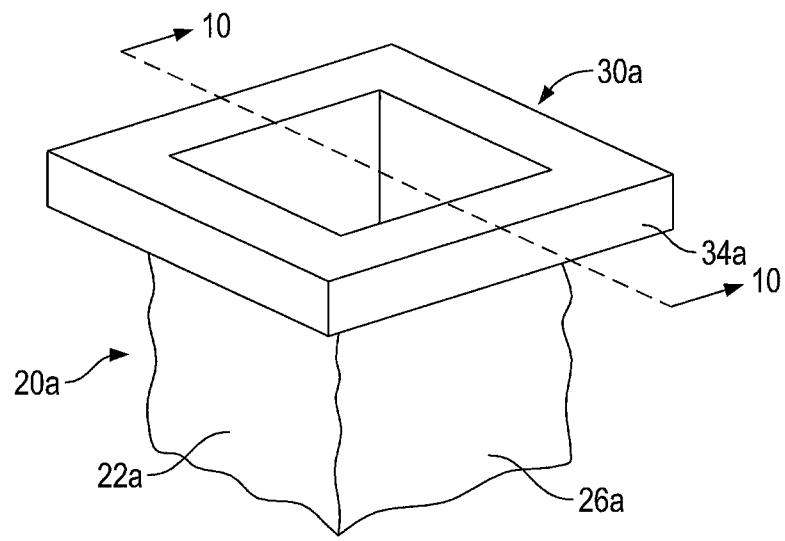
FIG. 9 is a perspective view of an alternative embodiment of a liner assembly.
Figure 10:
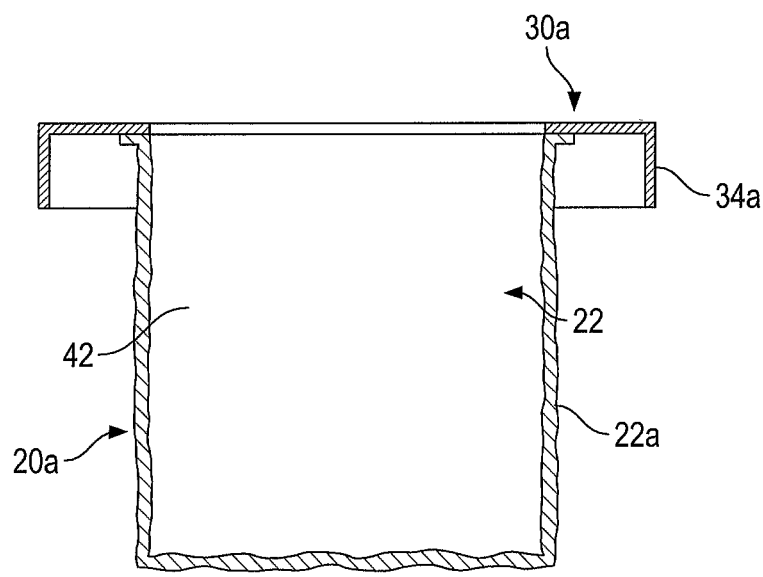
FIG. 10 is a cross-sectional view thereof taken along line 10-10 of FIG. 9

Turning to FIGS. 9 and 10, in some embodiments, an inner liner assembly 20A may be constructed from a flange 30A and an organic fiber liner 22A similar to a vacuum cleaner bag material. The flange 30A may comprise a rigid organic fiber material, such as paperboard or cardboard with downwardly turned tabs 34A as previously described. The liner 22A may comprise an organic, wood or plant fiber material, such as a paper material or reinforced paper material, creating the inner wall 26A with a wall thickness being significantly thinner than the previously described inner box 22, yet providing the same strength as a cardboard material to prevent perforations. The liner 22A may be secured to the flange in a sealed collar configuration with an upper peripheral edge of the liner glued, stitched, or otherwise secured to the lower surface of the flange 30A or captured and secured between two layers of paperboard material (not shown).

Figure 11:
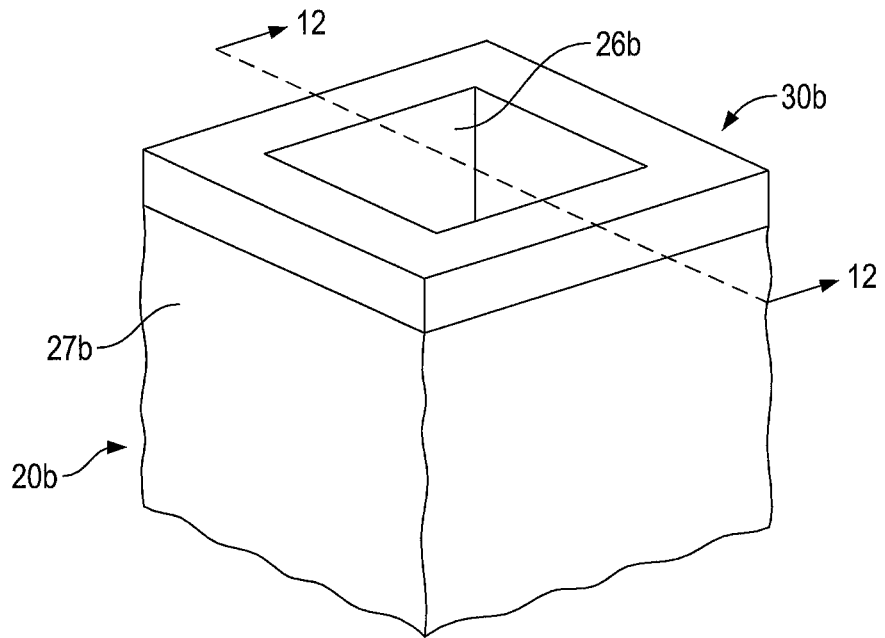
FIG. 11 is a perspective view of another alternative liner assembly.
Figure 12:
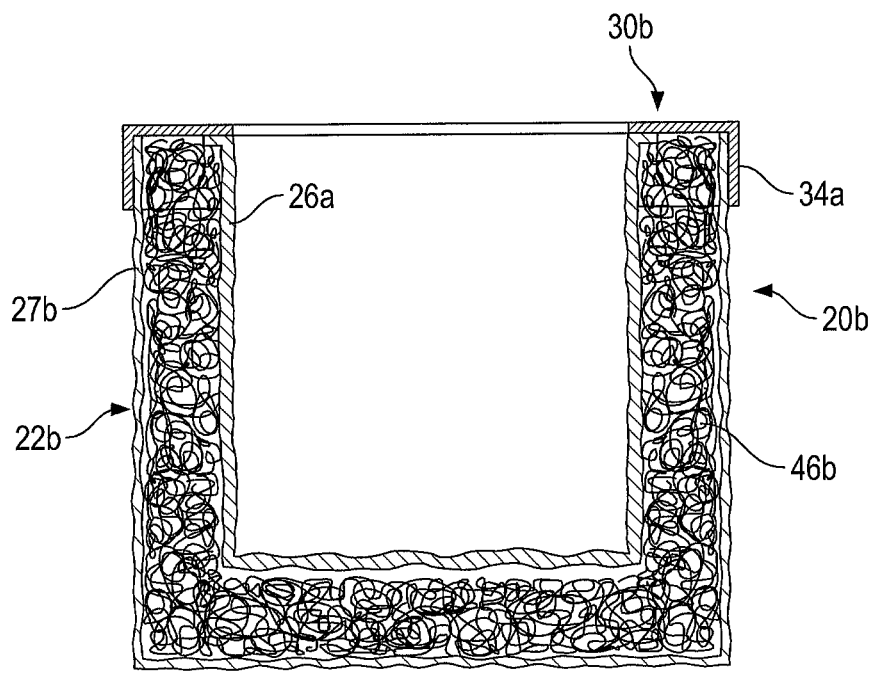
FIG. 12 is a cross-sectional view thereof taken along line 12-12 of FIG. 11.
Figure 13:
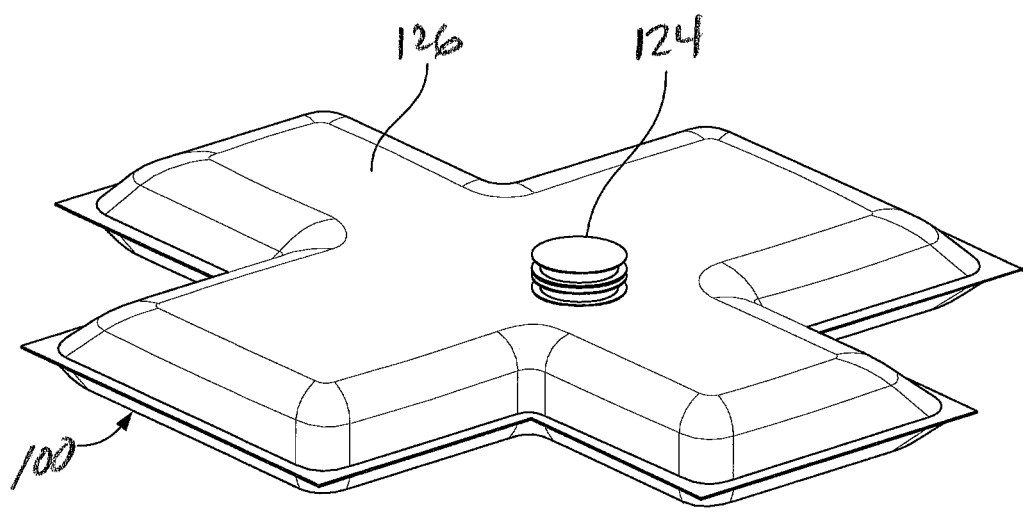
FIG. 13 is a perspective view of a first embodiment of a phase change material (PCM) bladder constructed in accordance with the teachings of the present invention.

In some embodiments, as illustrated in FIGS. 11 and 12, a liner assembly 20B may include a double walled paper liner assembly wherein the loose-fill organic insulation material 46B is pre-filled and sealed between inner and outer paper liner walls 26B, 27B secured to a flange 30B with a sealed collar configuration. In this regard, the loose-fill insulation may be pre-filled in a separate operation and then the competed liner assembly 20B could simply be inserted into the open top of an outer box without securing the flange to the outer box 12.

A portion of the product cavity 42 may in some embodiments be filled with phase change material (PCM) packs, bricks, etc. or other heating or cooling medium, such as dry ice, to provide a desired, consistent temperature profile within the product cavity 42.

Some embodiments may include a novel phase change material (PCM) bladder which is designed and configured to receive and hold a "flowable PCM" 12 at the point of packaging, thus completely eliminating the need to pre-condition and store PCM gel packs.

The term "flowable PCM" as used within the specification refers to a PCM material which can be pumped with conventional pumping devices from a storage tank or container into the PCM bladder 100 as described herein. At the present time, the exemplary embodiment of a "flowable PCM" comprises a "slurry ice" material that is produced on-site and pumped through insulated hoses to a filling head. However, the inventive concepts herein should not be limited to any specific "flowable PCM".

Figure 18:
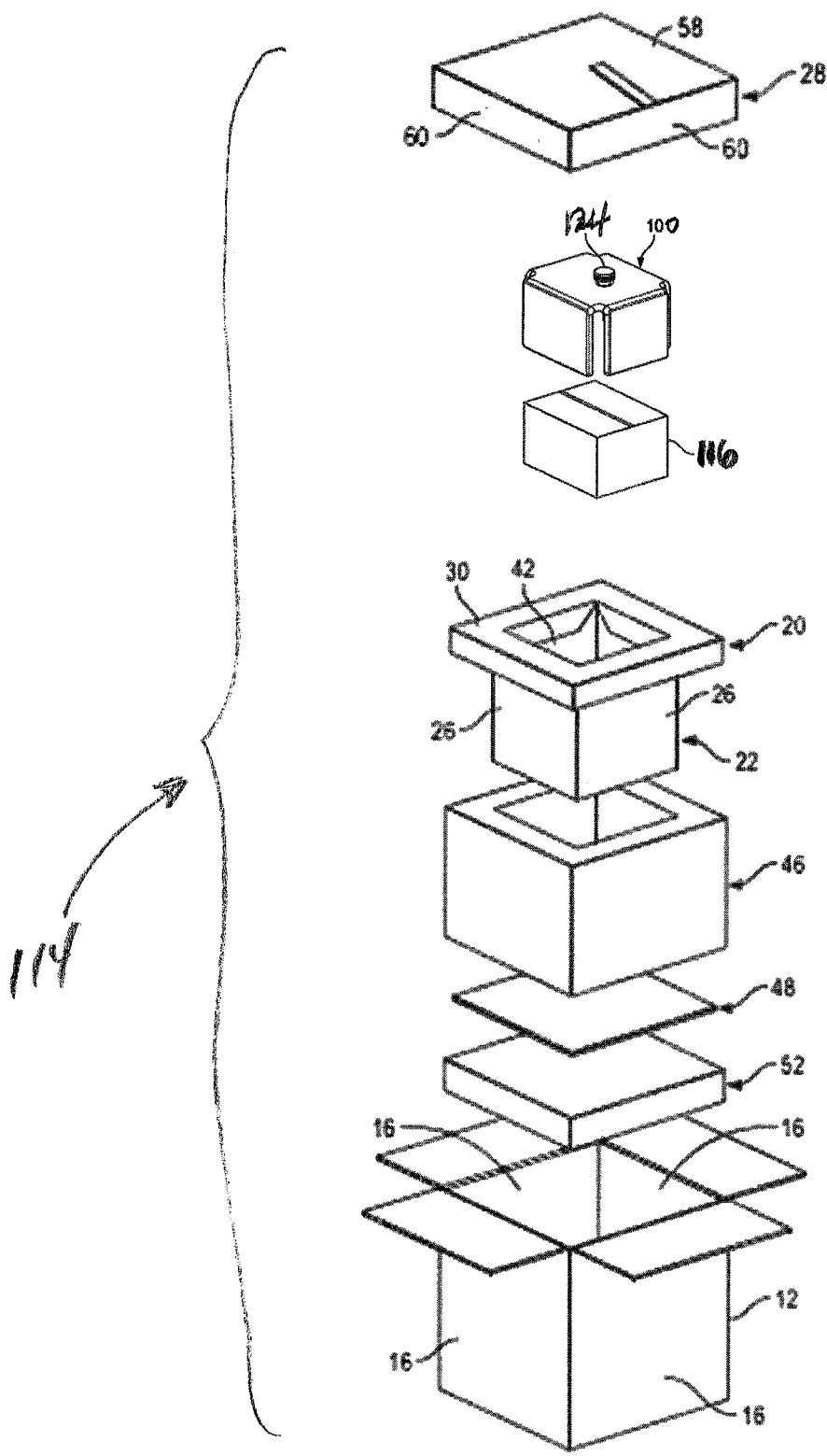
FIG. 18 is an exploded perspective view of a temperature controlled product shipper including an exemplary PCM bladder of the present invention.

Referring briefly to FIG. 18, the present PCM bladder 100 is designed to be useful in a temperature controlled product shipper generally indicated at 114. The product shipper 114 comprises an exemplary shipper 100 as described hereinable, an interior product box 116, or mastercase, as it is sometimes called. The product box 116 is received inside the product cavity 42, and the PCM bladder 100 is received into a space defined between the inside surface of the inner box and the outside surface of the product box 116.

Figure 15:
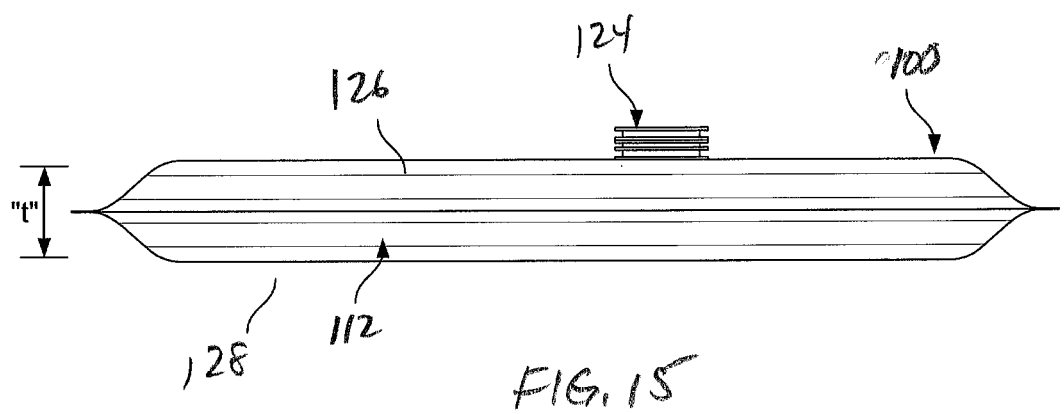
FIG. 15 is a cross-sectional view thereof taken along line 15-15 of FIG. 14.

The PCM bladder 100 may include a single bladder chamber 122 having a filling port 124. The bladder 100 may be constructed from polyethylene sheets 126,128 which are overlaid in substantially coextensive adjacent relation and heat sealed, or otherwise sealed, around the peripheral edges to form the interior bladder chamber 22. Referring to FIG. 15, the bladder chamber 122 is configured so as to have a substantially uniform thickness "t" across its extent when filled with the flowable PCM 112.

Figure 16:
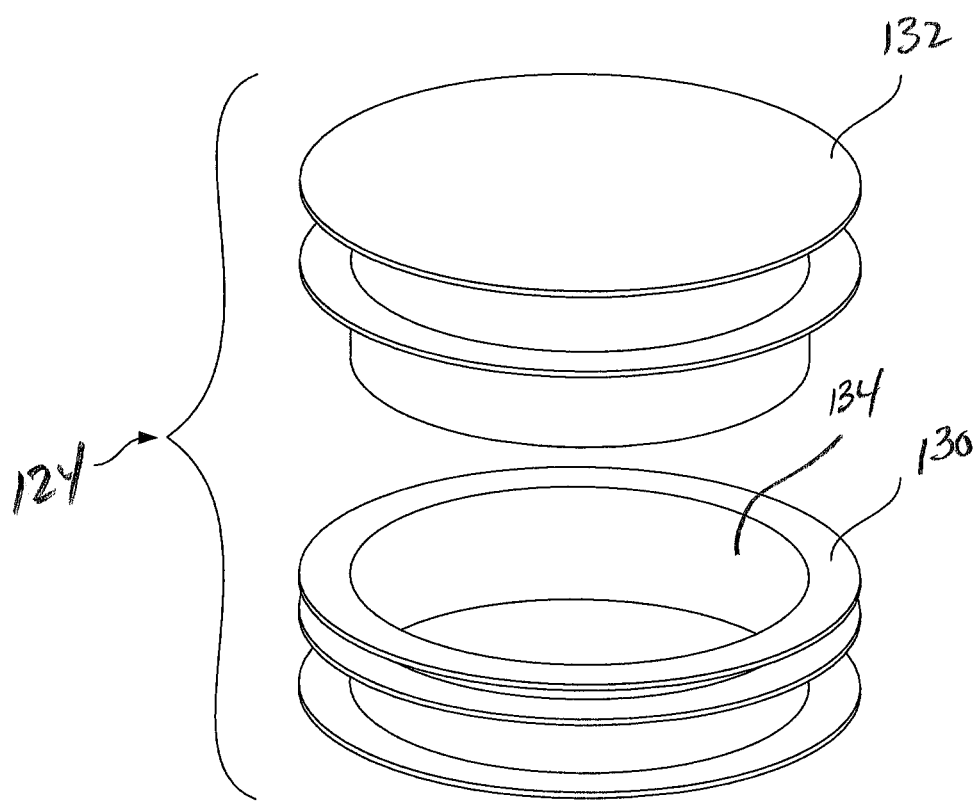
FIG. 16 is a perspective view of a filling port.

The filling port 124 may comprises a filling bung 130, or other filling port, which is sealed to the top sheet 126 and a stopper 132 removably seated in the bung hole 134 (FIG. 16). It is noted that the PCM bladder 100 is intended to be filled at the point of shipment, where the PCM bladder 100 is inserted into the shipper 114 with the outer box 12 still open. In this regard, the filling port 124 is presented for filling on the top of the shipper 114 where it can be accessed by an automated filling apparatus (not shown). In use, the filling bung 130 is grabbed by an automated, robotic filling head which removes the stopper 132, fills the bladder chamber 122 with a desired PCM 112, and replaces the stopper 132. It should be noted that a variety of different types of filling ports 124 can be utilized depending on the application and needs of the end user, and the concepts herein should not be limited only to a filling bung with a removable stopper.

Figure 14:
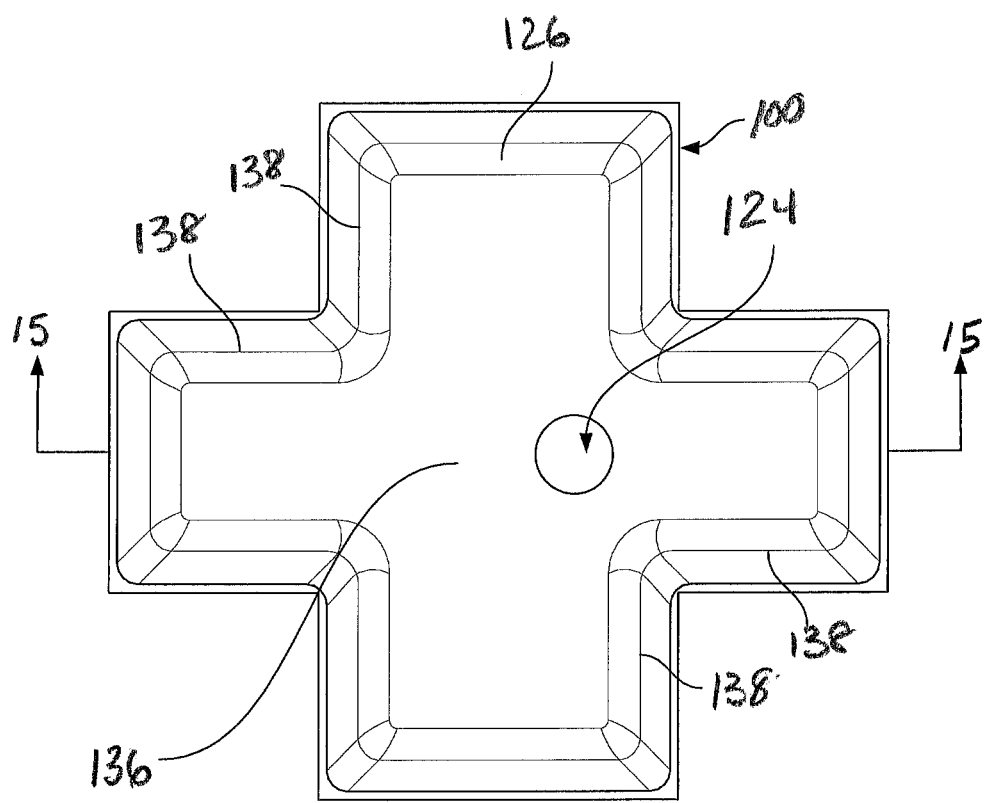
FIG. 14 is top view thereof.
Figure 17:
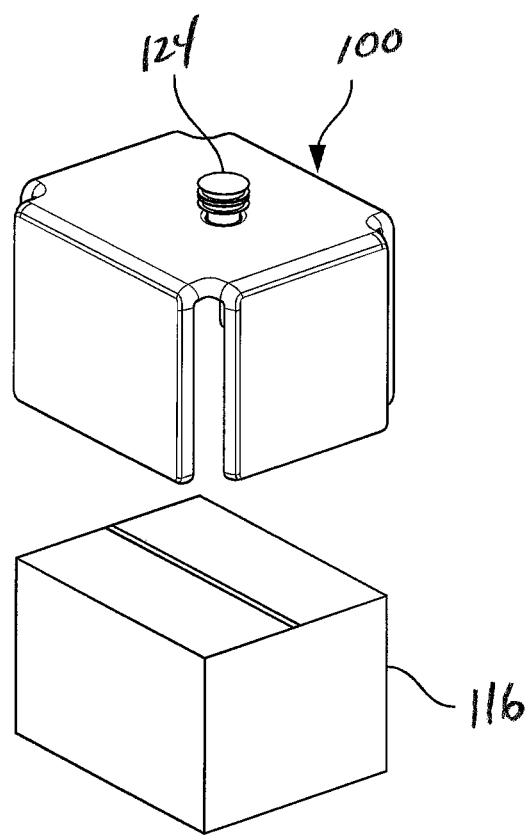
FIG. 17 is a perspective view of the PCM bladder and a representative product box where the PCM bladder overlays five (5) of the six (6) sides of the product box.

To accommodate the rectangular shape of most typical product boxes 116, the bladder 100 is formed in the shape of a symmetric cross including a central body portion 136 and appendage portions 138 extending outwardly therefrom (See FIG. 14). The central body portion 136 and appendage portions 138 effectively overlay five (5) of the six (6) sides of the product box 116 (See FIG. 17).

Figure 19:
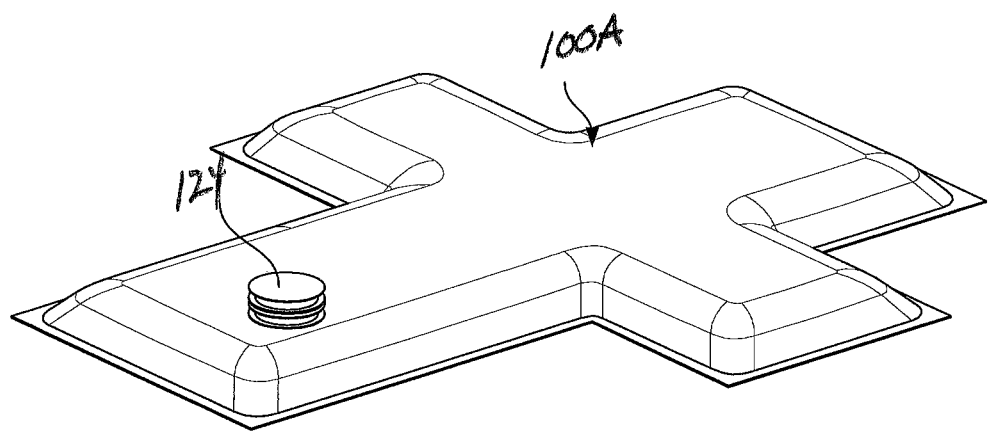
FIGS. 19-20 are perspective views of an exemplary asymmetrical PCM bladder effective for overlaying six (6) sides of the product box.
Figure 20:
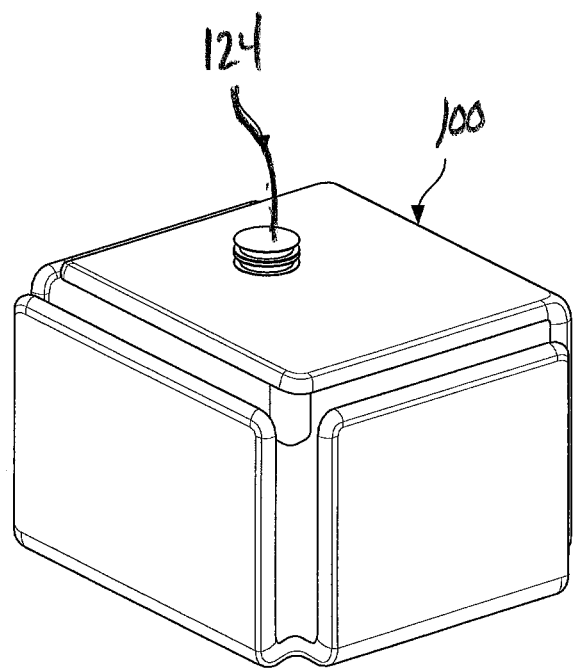

An alternate version indicated at 100A in FIGS. 19 and 20, is asymmetrical and effectively overlays all six (6) sides of the product box 116. The bladder chamber 122 in this version is also configured so that it has a substantially uniform thickness when filled with the flowable PCM 112 whereby the bladder 100A provides a substantially uniform thermal profile around all six (6) sides of the product box.

While the exemplary embodiment illustrated a rectangular shaped product box 116 and associated shape for the PCM bladder 100, it should be understood that the shape of the bladder 100 may be altered to accommodate other product box shapes, such as for example, a cylinder. In the case of a cylindrical product box (not shown), the PCM bladder may comprise a circular central portion and appendages which extend radially outward from the central portion.

Figure 21:
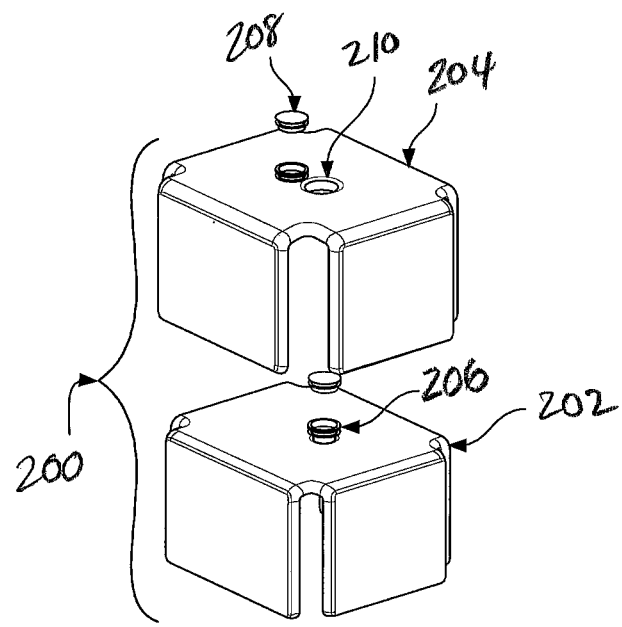
FIGS. 21-22 are perspective views of yet another exemplary embodiment comprising a PCM bladder system having two discrete PCM bladders which are overlaid in coextensive relation.
Figure 22:
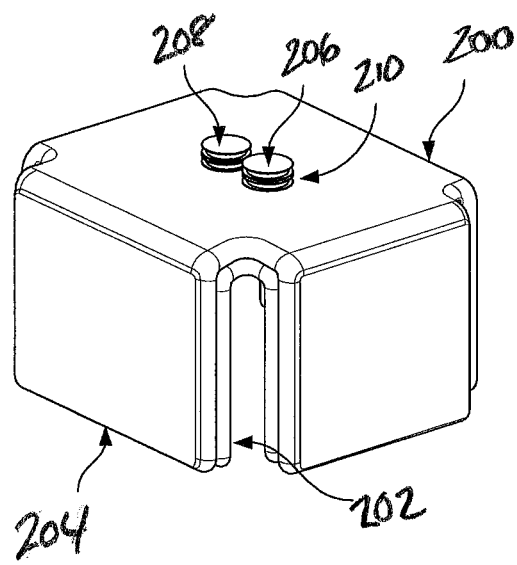

Referring now to FIGS. 21-22, in another exemplary embodiment, a PCM bladder system 200 comprises two discrete PCM bladders 202, 204 which are overlaid in coextensive relation and cooperate to provide a desired thermal profile. The bladders 202, 204 are constructed in the same manner as in the first embodiment described above. However, the first bladder 202 receives a PCM pre-conditioned at a first temperature while the second bladder 204 receives a PCM pre-conditioned at a second temperature.

Referring to FIG. 21, the first, or inner, bladder 202 includes a first filling port 206 sealed on the upper sheet, while the second, or outer, bladder 204 includes a second filling port 208 sealed on the upper sheet and an aperture 210 through which the first filling port 206 extends when the second bladder 204 is overlaid on top of the first bladder 202 (See FIG. 22). Both bladders 202, 204 are formed in the shape of crosses in the exemplary embodiments to overlay 5 outer sides of the product box 116. The dual bladder PCM system 200 is received into a product shipper 114 as described hereinabove.

Figure 23:
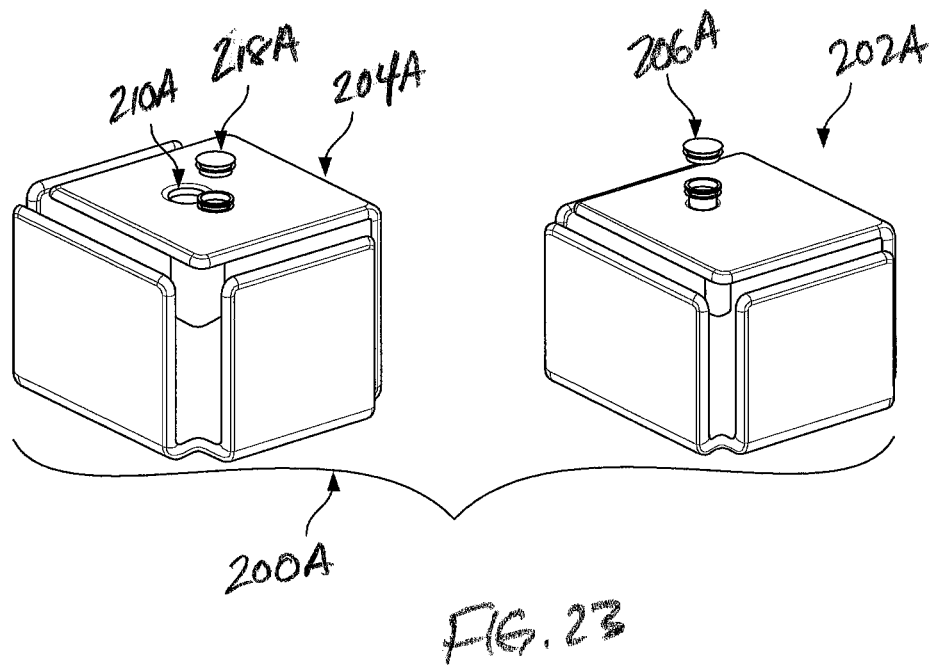
FIGS. 23-24 are perspective views of another exemplary embodiment comprising an asymmetric dual PCM bladder system having two discrete PCM bladders which are overlaid in coextensive relation to cover all six (6) sides of the product box.
Figure 24:
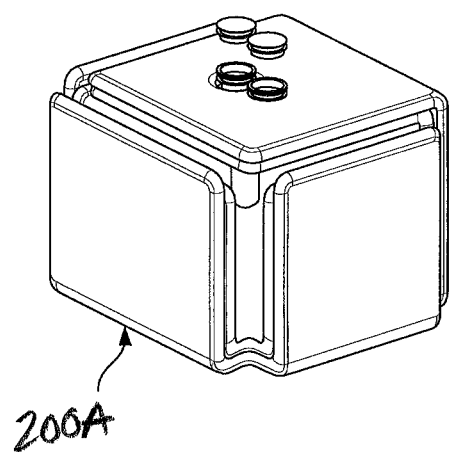

An alternate version indicated at 200A in FIGS. 23-24, provides asymmetrical first and second PCM bladders 202A and 104A and effectively overlays all six (6) sides of the product box 16. The six-sided, dual-bladder PCM system 200A is also received into a product shipper 114 as described hereinabove.

Figure 25:
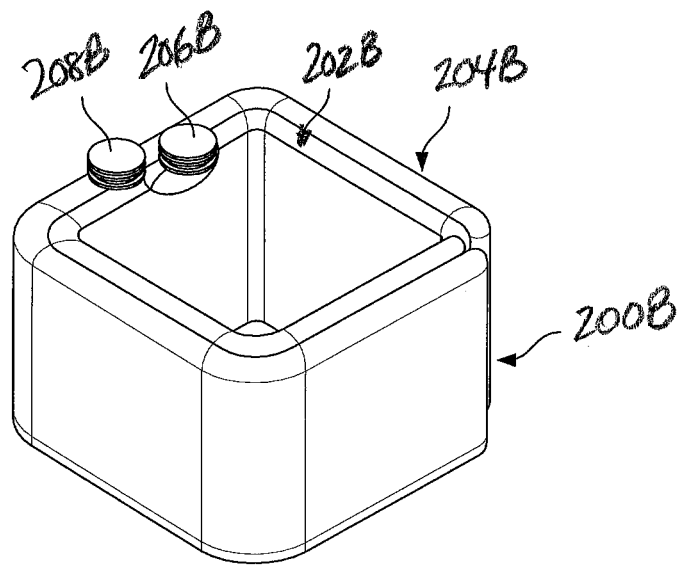
FIGS. 25-26 are perspective views of another alternative bladder system effective for overlaying the four side surfaces of the product box.
Figure 26:
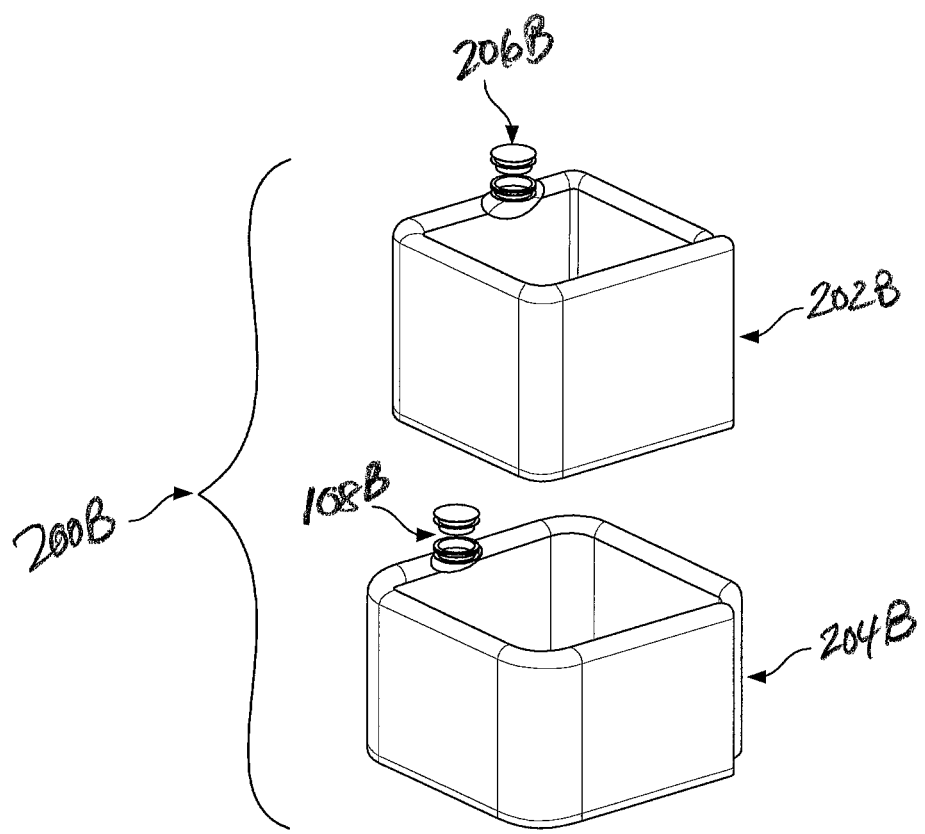
Figure 27:
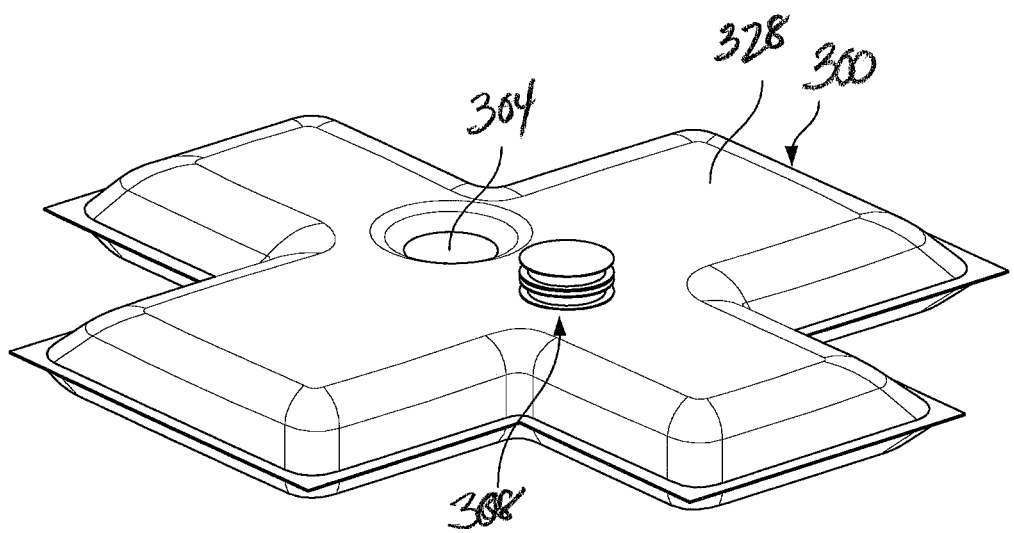
FIG. 27 is perspective view of another exemplary dual chamber PCM bladder formed as a single heat sealed construction.
Figure 28:
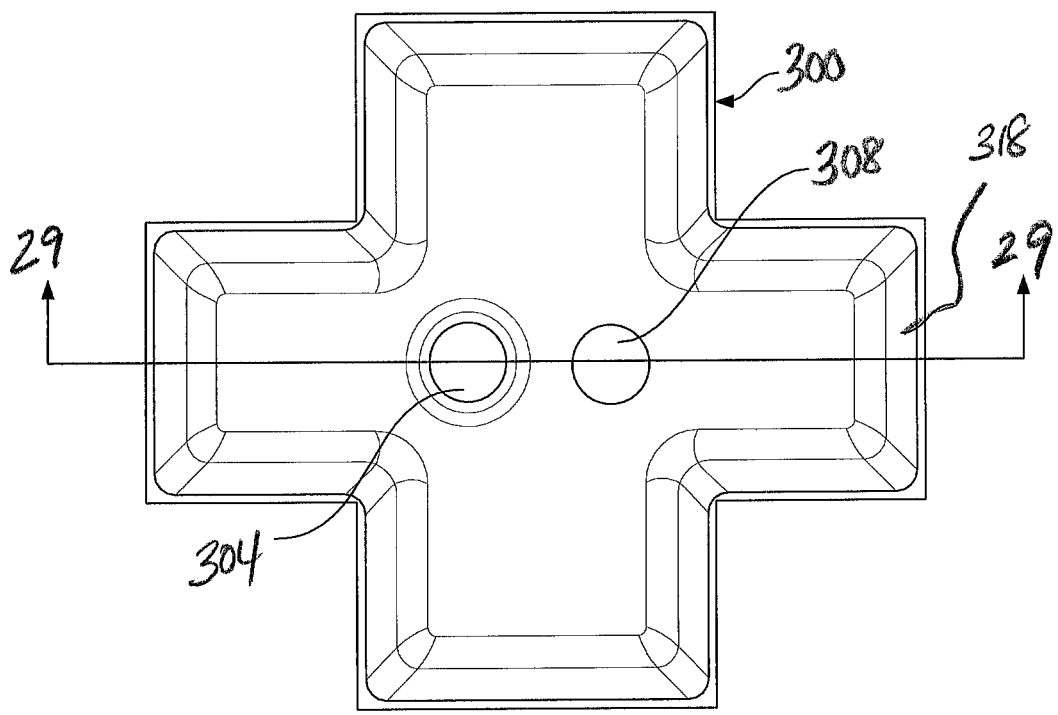
FIG. 28 is a top view thereof.
Figure 29:
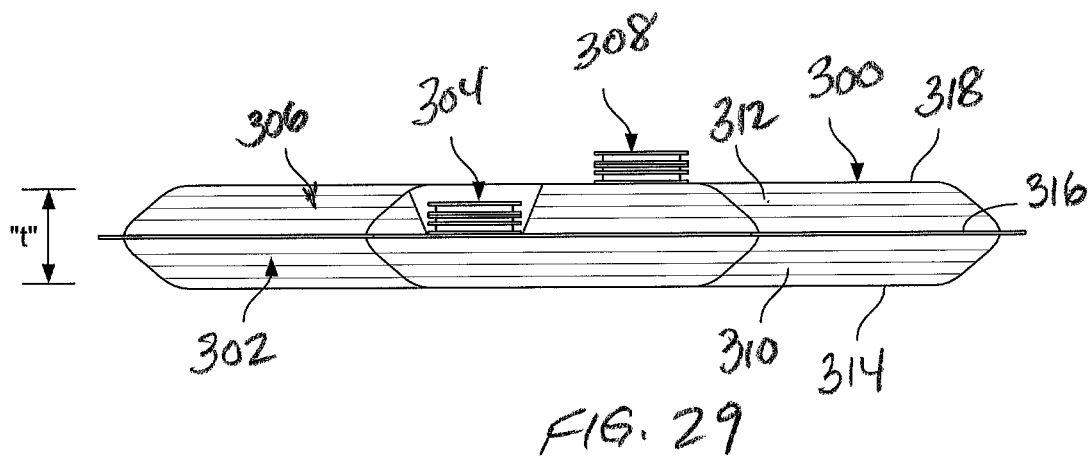
FIG. 29 is a cross-section view thereof taken along line 29-29 of FIG. 28.
Figure 30:
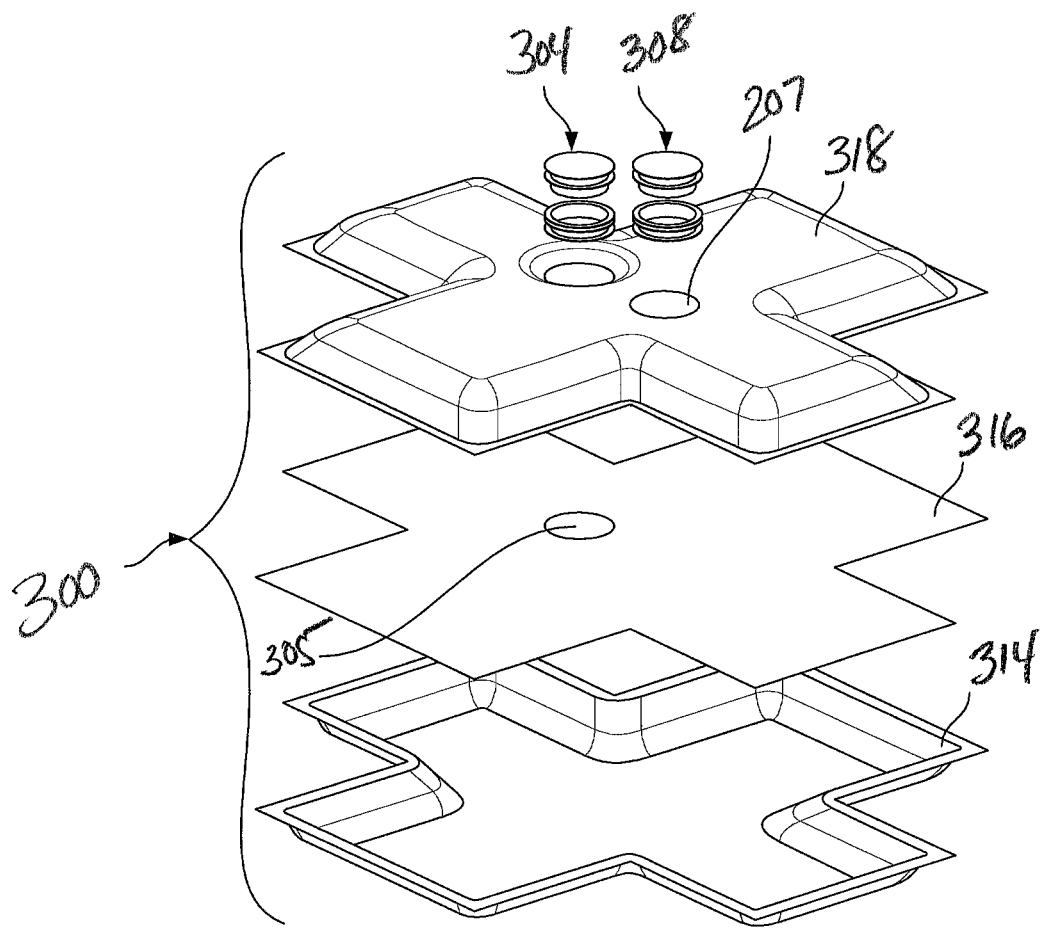
FIG. 30 is an exploded perspective view thereof.

Yet another alternate version indicated at 200B in FIGS. 25-26, provides first and second linear PCM bladders 202B and 204B which are effective for overlaying the four side surfaces of the product box 116 leaving the top and bottom surface uncovered. The filling ports 206B, 208B on these linear PCM bladders are positioned in the side edges so that they are accessible from the top of the shipper.

In some embodiments as illustrated in FIGS. 27-30, a dual chambered

PCM bladder 300 is provided in a single heat-sealed construction. The dual chamber PCM bladder 300 comprises a first bladder chamber 302 having a first filling port 304 and a second bladder chamber 306 having a second filling port 308. Each bladder chamber 302, 306 receives a flowable PCM 310, 312 preconditioned at a predetermined temperature.

The dual chambered bladder 300 comprises a lower sheet 314, a middle sheet 316 and an upper sheet 318 overlaid in substantially coextensive relation and sealed around the peripheral edges thereof to form the two chambers 302, 306. The first bladder chamber 302 is defined between the lower sheet 314 and the middle sheet 316 and the second bladder chamber 306 is defined between the middle sheet 316 and the upper sheet 318. The first filling port 304 is sealed at aperture 305 on the upper surface of the middle sheet 316 and the upper sheet 318 is sealed around the peripheral edge of the first filling port 304. The second filling port 308 is sealed at aperture 307 on the upper surface of the upper sheet 318 whereby the first and second filling ports 304, 308 are both accessible for filling from above the upper surface of the upper sheet 318.

Figure 31:
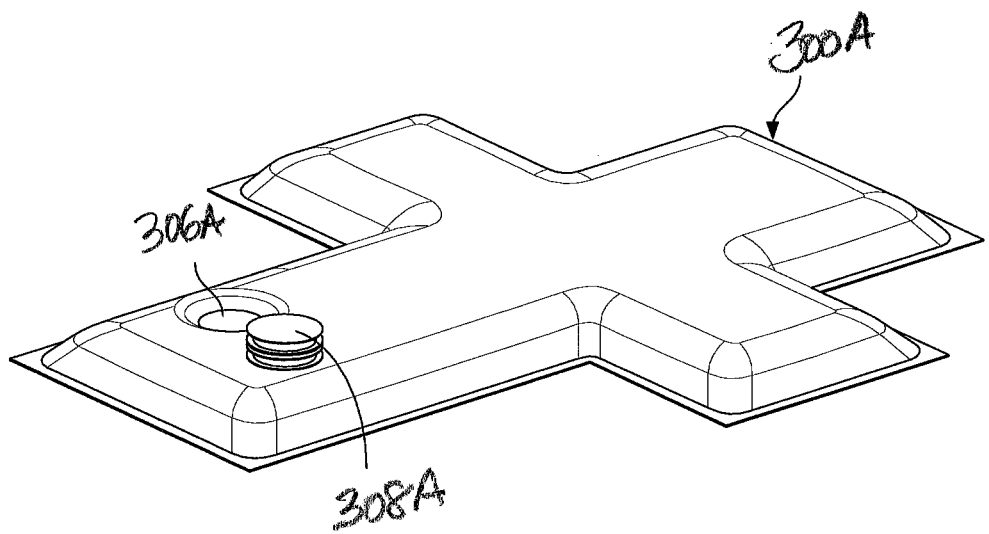
FIG. 31 is a perspective view of an asymmetrical dual chamber PCM bladder effective for overlaying six (6) sides of the product box.

An alternate version indicated at 300A in FIG. 31, provides asymmetrical first and second bladder chambers and effectively overlays all six (6) sides of the product box 16.

Figure 32:
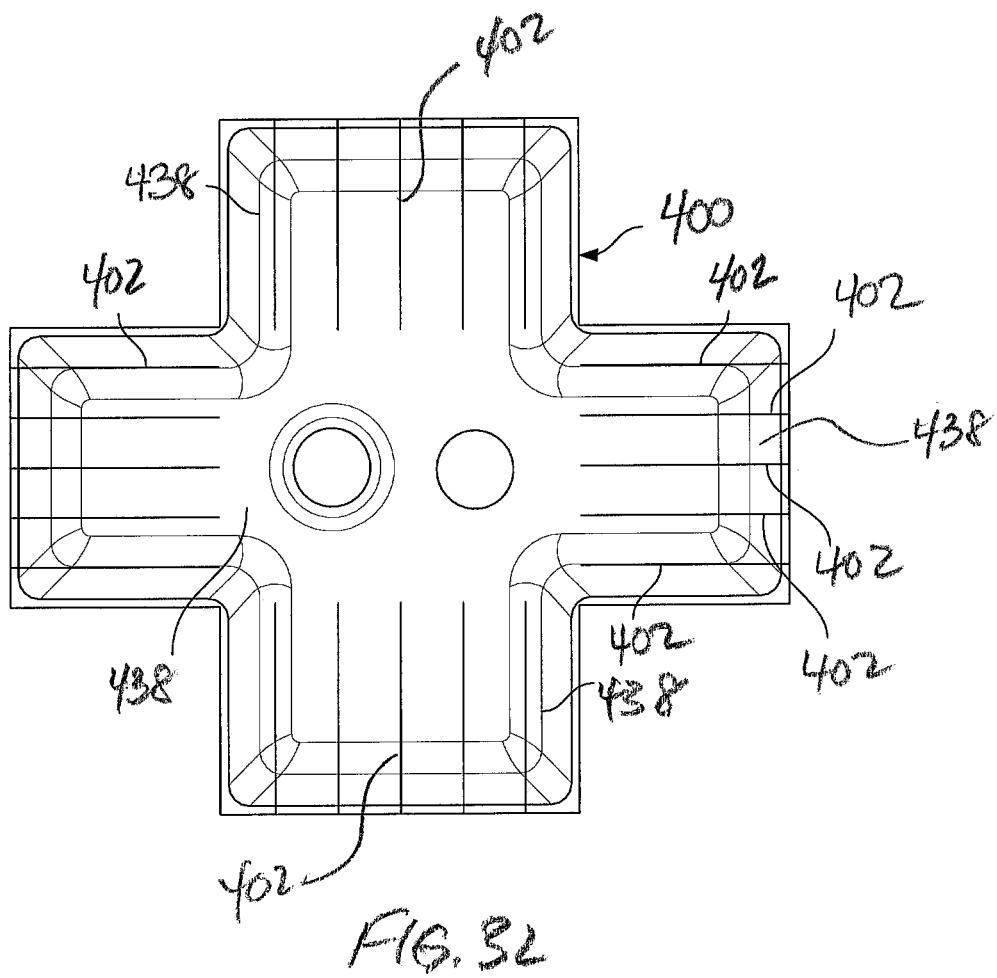
FIG. 32 is a perspective view of an embodiment comprising a dual chamber bladder including a plurality of flutes which divide the bladders into a plurality of sections.

As illustrated in FIG. 32, some embodiments may comprise a PCM bladder 400 that includes a plurality of flutes 402 formed by heat sealing the polyethylene sheets together. The flutes 402 divide the appendage portions 438 of the bladder 400 into a plurality of sections and provide support and stability for the PCM within the bladder 400. The bladder 400 may comprise a single chamber bladder or a dual chamber bladder (as illustrated), both as described hereinabove. The flutes 402 may extend vertically, as illustrated, or may be oriented horizontally, or in any other direction which is necessitated by the design of the shipper and/or bladder.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A recyclable, thermally insulated shipping container comprising:
    an outer box having a bottom wall, a plurality of sidewalls and a top wall;
    an inner liner assembly comprising an inner box having a bottom wall and a plurality of sidewalls defining a product cavity,
    said inner liner assembly further comprising a liner flange having a continuous top shelf portion, a plurality of outer securing tabs projecting downwardly from an outer peripheral edge of the top shelf portion, and a plurality of inner securing tabs projecting downwardly from an inner peripheral edge of the top shelf portion,
    said inner securing tabs being received within the sidewalls of the inner box and secured to inner surfaces of said inner box sidewalls,
    said outer securing tabs being received within the sidewalls of the outer box and secured to inner surfaces of said outer box sidewalls,
    said inner liner assembly and said outer box cooperating to form a first thermal insulating cavity between said respective sidewalls;
    a strengthening panel received within a bottom portion of the outer box and positioned in adjacent facing relation with the bottom wall of the inner box,
    said outer box bottom wall and sidewalls and said strengthening panel cooperating to form a second thermal insulating cavity;
    a loose-fill organic fiber insulation being filled and packed within said first and second thermal insulating cavities to provide a predetermined thermal insulating value; and
    a PCM bladder configured and arranged to receive and retain a flowable phase change material preconditioned at a predetermined temperature,
    said PCM bladder being removably received within the product cavity.

2. The recyclable, thermally insulated shipping container of claim 1 further comprising a thermally insulated lid assembly,
    said thermally insulated lid assembly comprising
        a lid box having a bottom wall, a top wall and a plurality of sidewalls cooperating to define a thermal insulating lid cavity, and
        a loose-fill cellulose insulation being filled and packed within said thermal insulating lid cavity to provide a predetermined thermal insulating value,
    said inner liner assembly being secured within said outer box such that the shelf portion is positioned below the top wall thereof to create a lid cavity above said shelf portion and below said top wall,
    said thermally insulated lid assembly being received within said lid cavity.

3. The recyclable, thermally insulated shipping container of claim 2, wherein said outer box, said liner flange, said inner box and said lid box are constructed from a wood fiber or plant fiber material.

4. The recyclable, thermally insulated shipping container of claim 3, wherein said wood fiber or plant fiber material is cardboard.

5. The recyclable, thermally insulated shipping container of claim 1, wherein said outer box, said liner flange and said inner box are constructed from a wood fiber or plant fiber material.

6. The recyclable, thermally insulated shipping container of claim 5, wherein said wood fiber or plant fiber material is cardboard.

7. The recyclable, thermally insulated shipping container of claim 1 wherein said loose-fill organic fiber insulation is cellulose.

8. The recyclable thermally insulated shipping container of claim 7 wherein said cellulose is packed at a density of between 2 and 6 pounds per cubic foot.

9. The recyclable thermally insulated shipping container of claim 8 wherein said cellulose is packed at a density between 3 and 5 pounds per cubic foot.

10. The recyclable, thermally insulated shipping container of claim 8 wherein said organic fiber insulation provides an insulating value between R2 and R6 per inch of wall thickness.

11. The recyclable, thermally insulated shipping container of claim 7 wherein said organic fiber insulation provides an insulating value between R2 and R6 per inch of wall thickness.

12. The recyclable, thermally insulated shipping container of claim 1 wherein said organic fiber insulation provides an insulating value between R2 and R6 per inch of wall thickness.

13. A recyclable, thermally insulated shipping container comprising:
　a cardboard outer box having a bottom wall, a plurality of sidewalls and a top wall;
　a cardboard inner liner assembly comprising a cardboard inner box having a bottom wall and a plurality of sidewalls defining a product cavity,
　said inner liner assembly further comprising a cardboard liner flange having a continuous top shelf portion, a plurality of outer securing tabs projecting downwardly from an outer peripheral edge of the top shelf portion, and a plurality of inner securing tabs projecting downwardly from an inner peripheral edge of the top shelf portion,
　said inner securing tabs being received within the sidewalls of the inner box and secured to inner surfaces of said inner box sidewalls,
　said outer securing tabs being received within the sidewalls of the outer box and secured to inner surfaces of said outer box sidewalls,
　said inner liner assembly being secured within said outer box such that the shelf portion is positioned below the top wall thereof to create a lid cavity above said shelf portion and below said top wall,
　said inner liner assembly and said outer box cooperating to form a side thermal insulating cavity between said respective sidewalls;
　a loose-fill cellulose insulation being filled and packed within said side thermal insulating cavity to provide a predetermined thermal insulating value
　a strengthening panel received within a bottom portion of the outer box and positioned in adjacent facing relation with the bottom wall of the inner box;
　said outer box bottom wall and sidewalls and said strengthening panel cooperating to form a bottom thermal insulating cavity,
　a loose-fill cellulose insulation being filled and packed within said bottom thermal insulating cavity to provide a predetermined thermal insulating value; and
　a lid assembly comprising a thermally insulated lid box having a bottom wall, a top wall and a plurality of sidewalls cooperating to define a thermal insulating lid cavity and a loose-fill cellulose insulation being filled and packed within said thermal insulating lid cavity to provide a predetermined thermal insulating value,
　said lid assembly being received within said lid cavity, and
　a PCM bladder configured and arranged to receive and retain a flowable phase change material preconditioned at a predetermined temperature,
　said PCM bladder being removably received within the product cavity.

14. The recyclable thermally insulated shipping container of claim 13 wherein said cellulose is packed at a density of between 2 and 6 pounds per cubic foot.

15. The recyclable thermally insulated shipping container of claim 14 wherein said cellulose is packed at a density between 3 and 5 pounds per cubic foot.

16. The recyclable, thermally insulated shipping container of claim 14 wherein said cellulose provides an insulating value between R2 and R6 per inch of wall thickness.

17. The recyclable, thermally insulated shipping container of claim 13 wherein said cellulose provides an insulating value between R2 and R6 per inch of wall thickness.

18. A recyclable, thermally insulated shipping container comprising:
　an outer box having a bottom wall, a plurality of sidewalls and a top wall;
　an inner liner assembly comprising an inner box having a bottom wall and a plurality of sidewalls defining a product cavity,
　said inner liner assembly further comprising a liner flange having a continuous top shelf portion, a plurality of outer securing tabs, and a plurality of inner securing tabs,
　said inner securing tabs being received within the sidewalls of the inner box,
　said outer securing tabs being received within the sidewalls of the outer box,
　said inner liner assembly and said outer box cooperating to form a first thermal insulating cavity between said respective sidewalls;
　said outer box bottom wall and sidewalls and said inner box cooperating to form a second thermal insulating cavity below said inner box;
　a loose-fill organic fiber insulation being filled and packed within said first and second thermal insulating cavities to provide a predetermined thermal insulating value; and
　a PCM bladder configured and arranged to receive and retain a flowable phase change material preconditioned at a predetermined temperature,
　said PCM bladder being removably received within the product cavity.

19. The recyclable, thermally insulated shipping container of claim 18 further comprising:
　a strengthening panel received within a bottom portion of the outer box and positioned in adjacent facing relation with the bottom wall of the inner box,
　said outer box bottom wall and sidewalls and said strengthening panel cooperating to form said second thermal insulating cavity.

* * * * *

UNITED STATES PATENT AND TRADEMARK OFFICE
CERTIFICATE OF CORRECTION

PATENT NO. : 11,953,262 B2
APPLICATION NO. : 17/668610
DATED : April 9, 2024
INVENTOR(S) : William C. Blezard et al.

It is certified that error appears in the above-identified patent and that said Letters Patent is hereby corrected as shown below:

On the Title Page

On the front and second page, item (63), in the "Related U.S. Application Data" section, the entirety thereunder is deleted:
"Continuation-in-part of application No. 17/508,418, filed on Oct. 22, 2021, now Pat. No. 11,731,826, and a continuation-in-part of application No. 17/239,550, filed on Apr. 24, 2021, now Pat. No. 11,698,215, which is a continuation of application No. 16/579,755, filed on Sep. 23, 2019, now Pat. No. 10,989,460, which is a continuation of application No. 15/401,050, filed on Jan. 8, 2017, now Pat. No. 10,422,565, which is a continuation of application No. 15/014,428, filed on Feb. 3, 2016, now Pat. No. 10,288,337, which is a continuation of application No. 13/891,259, filed on May 10, 2013, now Pat. No. 9,267,722."

In the Specification

The following section heading and two paragraphs appearing at Column 1, Lines 5 through 23, are deleted:
"CROSS-REFERENCE TO RELATED APPLICATIONS
This application is a continuation in part of U.S. application Ser. No. 17/508,418, filed Oct. 22, 2021, the entire contents of which are incorporated herein by reference.
This application is also a continuation-in-part of U.S. application Ser. No. 17/239,550, filed Apr. 23, 2021, which is a continuation of U.S. application Ser. No. 16/579,755, filed Sep. 23, 2019, now U.S. Pat. No. 10,989,460, issued Apr. 27, 2021, which is a continuation of U.S. application Ser. No. 15/401,050, filed Jan. 8, 2017, now U.S. Pat. No. 10,422,565, issued Sep. 24, 2019, which is a continuation of U.S. application Ser. No. 15/014,428, filed Feb. 3, 2016 now U.S. Pat. No. 10,288,337, issued May 14, 2019, which is a continuation of U.S. application Ser. No. 13/891,259, filed May 10, 2013, now U.S. Pat. No. 9,267,722, issued Feb. 23, 2016, the entire contents of which are incorporated herein by reference"

Signed and Sealed this
Twenty-fifth Day of June, 2024

Katherine Kelly Vidal
*Director of the United States Patent and Trademark Office*